Figure 1:
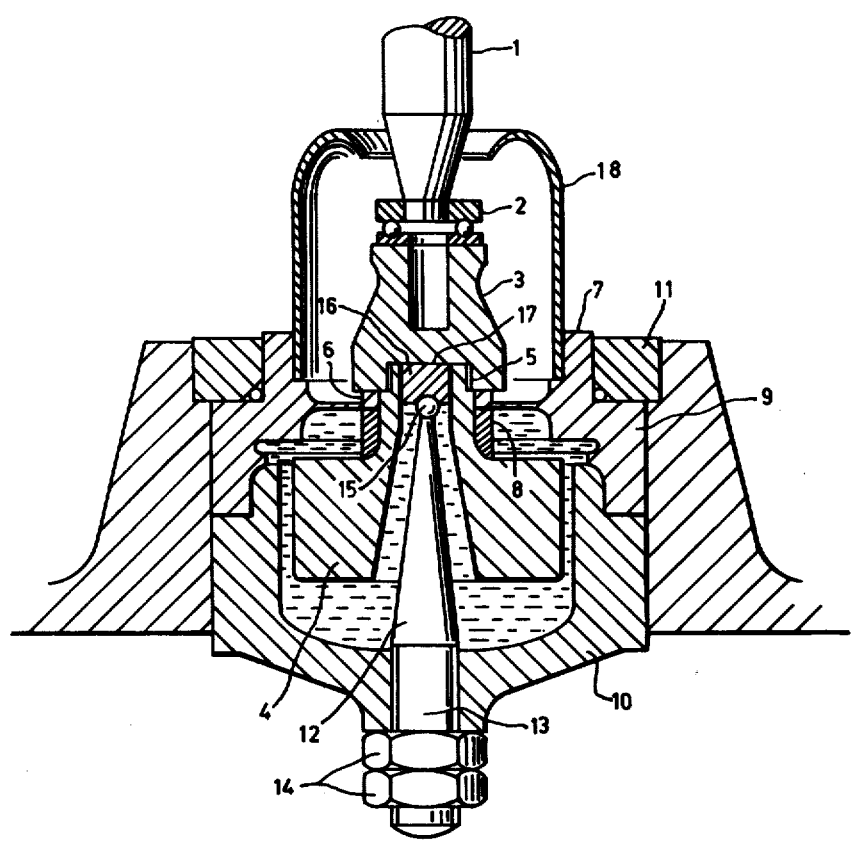

United States Patent [19]
Theyse et al.

[11] 3,904,001
[45] Sept. 9, 1975

[54] VIBRATION DAMPER WITH A HERMETICALLY CLOSED DAMPING CHAMBER

[75] Inventors: Frederik Herman Theyse, Bensberg-Herkenrath, Germany; John Louis Joseph Marie Janssen, Amsterdam; Erick Willem Johan Takes, Purmerend, both of Netherlands

[73] Assignee: Reactor Centrum Nederland, The Hague, Netherlands

[22] Filed: June 30, 1972

[21] Appl. No.: 268,165

[30] Foreign Application Priority Data
June 30, 1971 Netherlands.................... 7109007

[52] U.S. Cl............................... 188/266; 74/574
[51] Int. Cl........................................... F16f 15/10
[58] Field of Search.................. 248/19, 20, 358 R; 188/1 B, 266; 74/574

[56] References Cited
UNITED STATES PATENTS

| | | | |
|---|---|---|---|
| 2,380,899 | 7/1945 | Strachovsky | 248/358 R |
| 2,998,868 | 9/1961 | Meier | 188/266 |
| 3,464,290 | 9/1969 | Van Den Brink | 74/574 |
| 3,747,914 | 7/1973 | Thrasher | 248/358 R X |

Primary Examiner—Duane A. Reger
Attorney, Agent, or Firm—Cushman, Darby & Cushman

[57] ABSTRACT

Vibration damper for a rotating body, the said damper containing a damping chamber filled with fluid and closed off by a taut membrane that encompases in its center a bearing.

3 Claims, 2 Drawing Figures

VIBRATION DAMPER WITH A HERMETICALLY CLOSED DAMPING CHAMBER

SUMMARY

It was found to involve difficulties in practice to clamp a membrane-like part of this kind, usually of thin construction, into the inner and outer periphery in such a way that a reproducible shaping is ensured. In addition, there is still the requirement that a hermetic closure has to be effected at the clamping points.

In order to surmount this drawback the construction is made in such a way that this membrane-like wall portion is limited in extent and forms part of a hub-like, thickened inner component on the one hand and a rim-like outer component on the other hand, together forming a membrane ring.

The intended shaping is effected by first shaping the membrane ring by means of a chip-removing operation, after which the membrane itself is re-pressed between two walls of a die.

If the membrane is to be subjected to heavy loads, care is taken to incorporate a hinged support in the surface of the membrane.

The invention relates to a vibration damper for a body rapidly rotating about its axis, the said body being supported by one or more bearings, which damper is provided with a hermetically closed vessel filled with damping fluid and a damping member mounted in it, which latter permits of radial movement with respect to the vessel against a return force, the said damping member being connected via a coupling member with one of the said bearings, which coupling member is fixed gastight to a portion of the wall of the vessel that is formed as a membrane.

It was found to involve difficulties in practice to clamp a membrane-like part of this kind, usually of thin construction, into the inner and outer periphery in such a way that a reproducible shaping is ensured. In addition, there is still the requirement that a hermetic closure has to be effected at the clamping points.

In order to surmount this drawback the construction is made in such a way that this membrane-like wall portion is limited in extent and forms part of a hub-like, thickened inner component on the one hand and a rim-like outer component on the other hand, together forming a membrane ring. The two thickened portions can be clamped in position between other constructional parts without fear of deforming the membrane. The membrane is preferably made in such a way that, with no external load, the membrane is kept taut as a result of a state of internal tensile stress.

This measure helps to make the membrane lie perfectly flat. Unless these is a state of flattening stress in the membrane, it is liable to develops a convex curvature as a result of which a sudden buckling of the membrane may occur during service. This is undesirable for satisfactory working.

The intended shaping is effected by first shaping the membrane ring by means of a chip-removing operation, after which the membrane itself is re-pressed between two walls of a die in order to give it the right thickness, during which process the membrane is also pulled taut under the action of a tensile stress within it.

Practice has shown that a membrane is formed which satisfies all requirements if the membrane ring has a rim-shaped outer part formed by two cylinders of different diameters and by a wall thickness which is about 100 times thicker than the membrane.

If the membrane is to be subjected to heavy loads it should be provided with additional support, as one cannot then rely upon the carrying power of the membrane itself supplemented by the compressive force which the damping fluid exerts upon it from within. In that case care is taken to incorporate a hinged support in the surface of the membrane by way of reinforcement of the damping device, so as to relieve the membrane of axial bearing loads.

Figure 2:
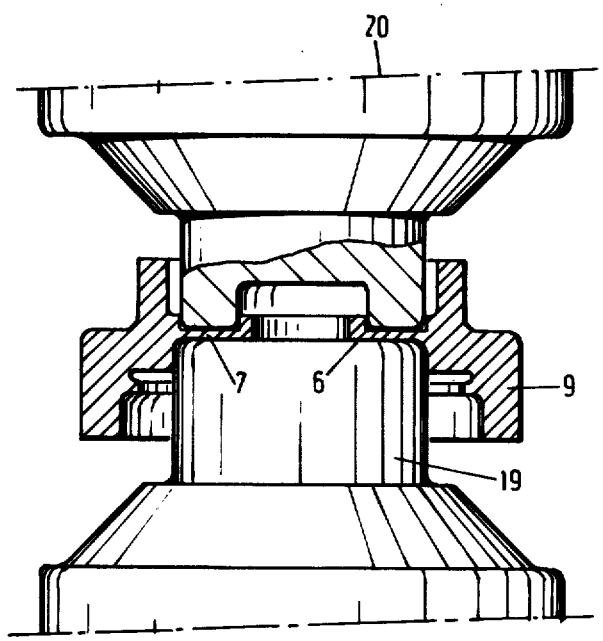

For this it is expedient to make the centre of the hinged support coincide with the centre of gravity of the whole assembly comprising the damping member, the coupling member and the bearing. Vibratory movements of the damping device may then indeed cause cambering of the membrane, but cannot product folds in it. The latter would result in rapid destruction of the membrane, as breakage due to fatique is then inevitable. A few embodiments of the invention are further elucidated by reference to two figures which give views as follows:

FIG. 1 — a vertical cross-section of a vibration damper according to the invention;

FIG. 2 — a membrane ring as re-pressed.

FIG. 1 shows a spindle 1 which, with the aid of a bearing 2, rests on the top of a coupling member 3. This coupling member is rigidly connected with a damping member 4, e.g. by means of a screw connection 5. A hub-shaped, thickened inner part 6 of a membrane 7 is clamped in position between the coupling member and the damping member. On the underside this component is then supported by a sleeve 8 which serves as a spacer and which is at the same time suitable for determining the position of clamping. On the outer side of membrane 7 there is a rim-shaped outer part 9 which is clamped in position between the cover 10 and the clamping ring 11.

Projecting upwards from the lowermost part of cover 10 is a support 12 which can be fixed in a predetermined position by means of the threaded part 13 as well as the nuts 14. Situated at the top end of 12 is a ball 15 on which a pivot bush 16 is mounted. This pivot bush rests against the underside 17 of the coupling member 3. Numeral 18 denotes a protecting hood serving to catch any lubricating oil which may spatter from bearing 2.

In FIG. 2 it is shown how the membrane-like part can be re-pressed after a chip-removing operation has been applied to it. For this purpose the membrane-like part is mounted on the lowermost matrix 19, after which membrane 7 is pressed between matrices 19 and 20. In this operation membrane 7 is subjected to stress, with the result that it remains flat under all circumstances.

For the material of the membrane-like part described in the foregoing, preference is given to a cold-tempering aluminum alloy.

We claim:

1. A vibration damper for a body which, being supported on one or more running bearings, rotates rapidly about its axis, which damper is provided with a hermetically closed vessel filled with damping fluid and a damping member mounted therein, which latter permits of radial movement with respect to the vessel against a return force, which damping member is fixed by means of a coupling member to one of the said running bearings, this coupling member and this damping member fixing gastight between them a membrane-like portion of the wall of the vessel, in which said membrane-like wall portion is bounded by and forms an integral part of a thickened hub-like inner part on the one hand and a likewise formed rim-like outer part on the other hand, together forming a membrane ring, the said membrane ring having a rim-like outer part which is composed of two cylinders of different diameters and having a wall thickness which is about 100 times thicker than the membrane.

2. A vibration damper for a body rotating rapidly about its axis, supported by one or more running bearings, which damper has a hermetically closed vessel filled with a damping fluid and a damping member incorporated in it, which member permits of radial movement against a return force with respect to the vessel, the said damping member being connected via a coupling member with one of the said running bearings, this coupling member being fixed gastight to a membrane-like portion of the wall of the vessel, in which, in the plane of the membrane, as a support of the damping member, an oscillating ball bearing consisting of a single ball is provided to relieve the membrane from axial bearing loads.

3. A vibration damper according to claim 2, in which the mid-point of the supporting bearing ball coincides with the center of gravity of the assembly as a whole, comprising the damping member and the running bearing.

* * * * *